United States Patent
Ye

(10) Patent No.: US 9,509,609 B2
(45) Date of Patent: Nov. 29, 2016

(54) FORWARDING PACKETS AND PE DEVICES IN VPLS

(71) Applicant: Hangzhou H3C Technologies Co., Ltd., Hangzhou, Zheijang (CN)

(72) Inventor: Jinrong Ye, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 19 days.

(21) Appl. No.: 14/399,963

(22) PCT Filed: Sep. 17, 2013

(86) PCT No.: PCT/CN2013/083605
§ 371 (c)(1),
(2) Date: Nov. 10, 2014

(87) PCT Pub. No.: WO2014/040569
PCT Pub. Date: Mar. 20, 2014

(65) Prior Publication Data
US 2015/0146727 A1    May 28, 2015

(30) Foreign Application Priority Data

Sep. 17, 2012   (CN) .......................... 2012 1 0344345

(51) Int. Cl.
| | | |
|---|---|---|
| *H04L 12/741* | (2013.01) | |
| *H04L 12/46* | (2006.01) | |
| *H04L 12/723* | (2013.01) | |
| *H04L 12/721* | (2013.01) | |

(52) U.S. Cl.
CPC ........... *H04L 45/745* (2013.01); *H04L 12/462* (2013.01); *H04L 12/4633* (2013.01); *H04L 12/4641* (2013.01); *H04L 45/50* (2013.01); *H04L 45/66* (2013.01)

(58) Field of Classification Search
CPC ............. H04L 12/462; H04L 12/4633; H04L 12/4641; H04L 45/50; H04L 45/66; H04L 45/745
See application file for complete search history.

(56) References Cited

U.S. PATENT DOCUMENTS

| 7,830,787 B1 | 11/2010 | Wijnands et al. |
| 2002/0161884 A1 | 10/2002 | Munger et al. |

(Continued)

FOREIGN PATENT DOCUMENTS

| CN | 1905509 A | 1/2007 |
| CN | 101534209 A | 9/2009 |

(Continued)

OTHER PUBLICATIONS

International Search Report and Written Opinion dated Dec. 19, 2013 issued on PCT Patent Application No. PCT/CN2013/083605 dated Sep. 17, 2013, The State Intellectual Pronerty Office. P.R. China.

(Continued)

*Primary Examiner* — Pao Sinkantarakorn
(74) *Attorney, Agent, or Firm* — Hewlett Packard Enterprise Patent Department

(57) ABSTRACT

A method is provided for a first provider edge (PE) device to forward packets in a virtual private local area network service (VPLS) network. The VPLS network includes PE devices that are each connected by one or more attachment circuits (ACs) to one or more customer edge (CE) devices. The first PE device receives a unicast packet on a first AC, which is associated with a first virtual switch instance (VSI) on the first PE device. The first PE device searches, in a media access control (MAC) address table associated with the first VSI, for an entry that matches a MAC destination address carried in the packet. When a matching entry is not found for the MAC destination address, the first PE device only floods the unicast packet to other ACs associated with the first VSI.

14 Claims, 10 Drawing Sheets

(56) References Cited

U.S. PATENT DOCUMENTS

| | | | |
|---|---|---|---|
| 2003/0065943 A1 | 4/2003 | Geis et al. | |
| 2005/0271036 A1 | 12/2005 | Cohen et al. | |
| 2012/0230335 A1* | 9/2012 | Filsfils | H04L 45/7453 370/392 |
| 2013/0223283 A1* | 8/2013 | Kompella | H04L 45/18 370/254 |

FOREIGN PATENT DOCUMENTS

| | | |
|---|---|---|
| CN | 101610216 | 12/2009 |
| CN | 101616082 | 12/2009 |
| CN | 101719857 | 6/2010 |
| CN | 102932499 | 2/2013 |
| EP | 20080800849 | 5/2010 |

OTHER PUBLICATIONS

M. Lasserre, Ed. and V. Kompella, Ed., "Virtual Private Lan Service (VPLS) Using Label Distribution Protocol (LDP) Signaling", RFC 4762, Jan. 2007.

Office Action, CN Application No. 201210344345.X, Date: Apr. 1, 2016, pp. 1-28, State Intellectual Property Office of the P.R. China.

\* cited by examiner

FORWARDING PACKETS AND PE DEVICES IN VPLS

CROSS-REFERENCE TO RELATED APPLICATION

The present application is a 371 application of International Application No. PCT/CN2013/083605 filed on Sep. 17, 2013 and entitled "Forwarding Packets and PE Devices in VPLS," which claims benefit of Chinese Patent App. No. CN 201210344345.X filed on Sep. 17, 2012.

BACKGROUND

To achieve reliability and redundancy, an enterprise network and its data centers often span multiple physical sites at different geographic locations. These sites may provide similar services and use layer 2 (data link layer) communication within each site. To achieve inter-site dynamic resource allocation and management, virtual machines (VMs) migrate between the sites. For the VM migration to appear transparent to users, the layer 2 networks at the sites are interconnected so the VMs do not change their Internet Protocol (IP) addresses. Virtual private LAN service (VPLS) is a technology for connecting layer 2 networks.

VPLS developed from a proposal for a multi-protocol label switching (MPLS) layer 2 virtual private network (L2VPN). VPLS provides a multi-to-multi point virtual private network (VPN). VPLS offers a robust solution to service providers. With VPLS, the technical advantages of Ethernet technology are combined with the technical advantages of MPLS to emulate all the functionalities of a conventional LAN. VPLS connects geographically isolated Ethernet-based LANs over a service provider's MPLS backbone network so the LANs operate collectively as if they were a single LAN.

BRIEF DESCRIPTION OF THE DRAWINGS

In the drawings.

Use of the same reference numbers in different figures indicates similar or identical elements.

DETAILED DESCRIPTION

Figure 1:
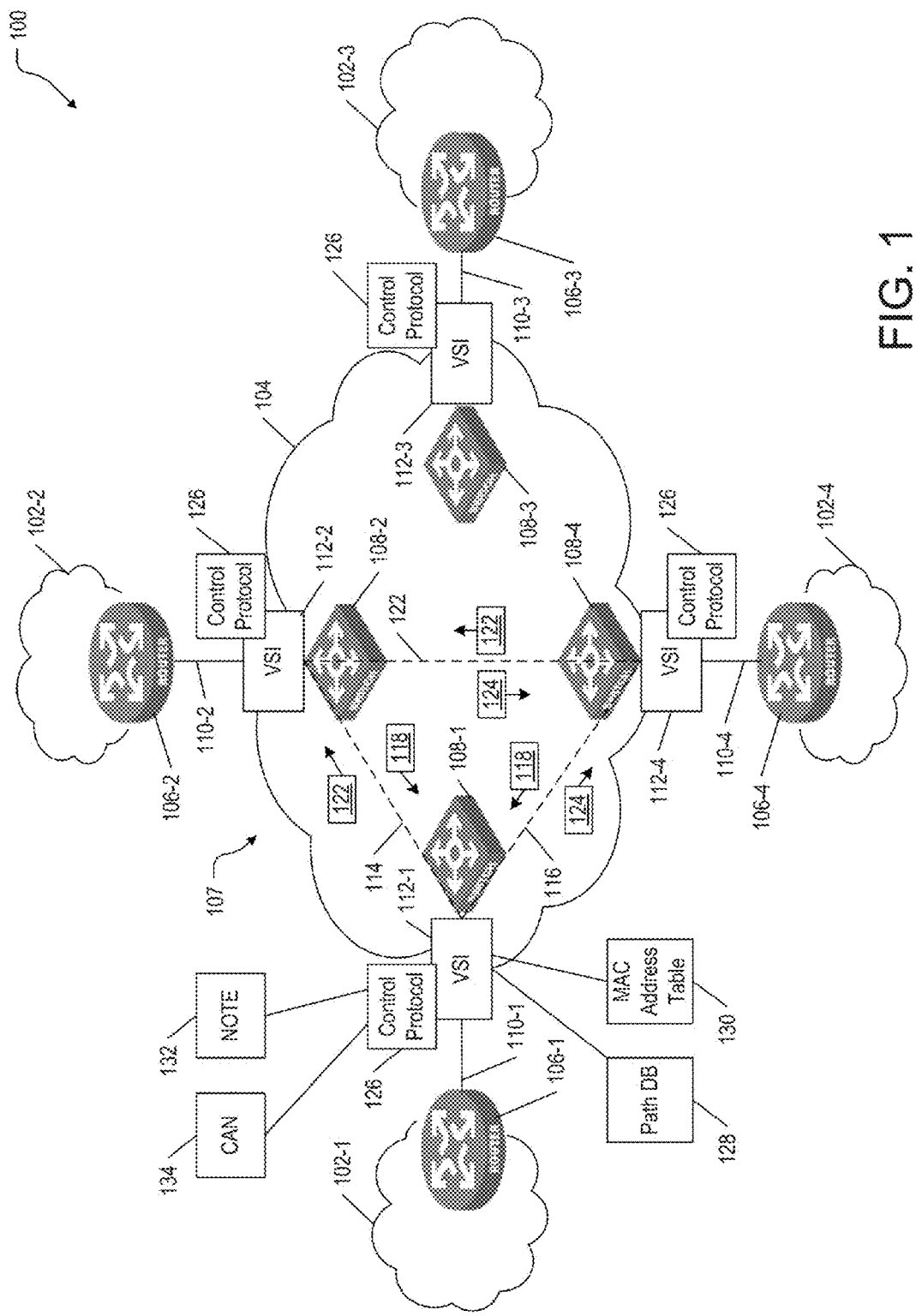
FIG. 1 shows a VPLS capable network with a VPLS instance in examples of the present disclosure.

As used herein, the term "includes" means includes but not limited to, the term "including" means including but not limited to. The terms "a" and "an" are intended to denote at least one of a particular element. The term "based on" means based at least in part on.

VPLS Terminology

Multi-protocol label switching (MPLS): MPLS is a forwarding technology that groups packets to be forwarded in the same manner into a class called forwarding equivalence class (FEC). Each class is identified by a MPLS or tunnel label having a fixed length.

Virtual private LAN service (VPLS): VPLS is a layer 2 multipoint virtual private network (VPN) that connects multiple customer sites in a bridged domain over a backbone network, such as a MPLS network. All customer sites in a VPLS instance (i.e., a particular VPN) appear to be on the same local area network (LAN) regardless of locations. VPLS emulates an Ethernet bridge over the backbone network and forwards Ethernet packets based on media access control (MAC) address or MAC address and virtual LAN (VLAN) tag.

Customer edge (CE) device: CE device is a router, switch, or host computer in a customer site that is directly connected with a backbone network. It is connected or coupled to personal computers (PCs) and servers at the customer site.

Provider edge (PE) device: PE device is a router, switch, or host computer that connects one or more CE devices to a backbone network for VPN service. It maps and forwards packets between private network and public network tunnels.

Attachment circuit (AC): AC is a physical or virtual circuit connecting a customer and a service provider. It is a link between a CE device and a PE device. Its ends use Ethernet interfaces.

Virtual switch instance (VSI): VSI is an Ethernet bridge function entity of a VPLS instance on a PE device. It forwards packets based on MAC address or both MAC destination and VLAN tag. It is a virtual edge device (VE).

Pseudo wire (PW): PW is a bidirectional virtual connection between VSIs on two PE devices. It has two unidirectional virtual circuit label-switched paths (VC LSPs) in opposite directions, each identified by a PW label, also called a VC label. PW is also called an emulated circuit. It is up only when both VC LSPs are up.

Tunnel: Tunnel is a direct channel between PE devices for transparent data transmission between the PE devices. Tunnels are used to carry PWs. A tunnel can be a MPLS tunnel or a generic routing encapsulation (GRE) tunnel. A tunnel can carry multiple PWs.

VPLS Member Discovery and PW Setup

A PE device of a VPLS instance may be manually configured with addresses of other PE devices in the same VPLS instance or the PE device can automatically discover the other PE devices using an automatic discovery protocol, such as the border gateway protocol (BGP).

A PE device uses a signaling protocol, such as label distribution protocol (LDP) or BGP, to establish a PW with another PE device in the same VPLS instance. Under manual or automatic configuration, each PE device allocates a PW label for an inbound VC LSP that the other PE device is to use to send packets to the PE device. The VPLS instance and the PW are identified in the signaling exchange by a VPLS ID and a PW ID, respectively. This exchange of PW labels takes place between each pair of PE devices participating in the VPLS instance.

VPLS MAC Address Management

VPLS emulates an Ethernet bridge that forwards packets based on MAC address or both MAC address and VLAN tag. Each PE device of a VPLS instance establishes a VSI for that VPLS instance. Each VSI maintains a MAC address table and supports MAC address learning and aging, and packet forwarding and flooding.

When a PE device receives a unicast packet from an AC, the packet is an Ethernet frame that may include a MAC source address, a MAC destination address, a VLAN tag with a VLAN ID, and a payload. Based on the AC's port number, the PE device maps the packet to a VSI of a particular VPLS instance and its MAC address table. When a PE devices receives a unicast packet from an inbound VC LSP of a PW, the packet is a MPLS packet that may include a tunnel label (an outer label), a PW label (an inner label), and an Ethernet frame. The PE device removes the tunnel label to expose the PW label. Based on the PW label, the PE device maps the packet to a VSI of a particular VPLS instance and its MAC address table.

When the MAC source address of the packet is unknown, the PE device creates a new entry in the MAC address table that maps the MAC address to the AC (and VLAN) or an outbound VC LSP of the PW. The PE device also starts an aging timer for the entry. When the aging timer expires, the PE device withdraws the entry from the MAC address table.

When the MAC source address of the packet is known, the PE device resets the aging timer for the entry.

When the MAC destination address of the packet is known, the PE device forwards the packet to an AC or a PW specified in the entry. When the packet is forwarded through a PW, the PE device adds a PW label and a tunnel label to encapsulate and forward the packet. Based on the PW label, the opposing PE device maps the packet to a local VSI of the same VPLS instance and its MAC address table.

PE devices may be fully meshed logically and they implements horizontal split forwarding to avoid loops. When a PE device receives from a PW associated with a VSI (1) a unicast packet with an unknown MAC destination address, (2) a multicast packet, or (3) a broadcast packet, the PE device floods the packet to all ACs associated with the VSI but not PWs associated with the VSI. When the PE device receives the same from an AC associated with the VSI, the PE device floods the packet to all the ACs and all the PWs associated with the VSI.

When a PE device receives a broadcast or multicast packet at an AC, which is indicated by the MAC destination address in the packet, the PE device broadcasts the packet to other PE devices having VSIs in the same VPLS instance. The PE device makes a copy of the packet and adds the appropriate PW labels and tunnel labels to send the packet to each of the other PE devices.

When using VPLS, valuable bandwidth may be consumed when PE devices flood the same unknown packet to a backbone network as part of the MAC address learning process. More specifically, the backbone network is flooded each time a PE device receives a packet with an unknown MAC destination address even though one or more of its peers may have already learned that MAC address.

MAC address learning in VPLS employs a complicated and therefore resource intensive process to allocate PW labels to PWs. More specifically, to distinguish between the inbound and the outbound VC LSPs of a PW, distinct PW labels are provided to the VC LSPs. When the VSI has multiple PWs, unique PW labels have to be allocated to numerous VC LSPs.

A PE device broadcasts a packet to other PE devices in the same VPLS instance by sending copies of the packet over PWs to the other PE devices. When parts of the PWs share a common physical link from the PE device to a provider router (P router), valuable bandwidth is consumed by sending the copies of the same packet over the common physical link.

Examples of Present Disclosure

In examples of the present disclosure, a first multi-point to multi-point label-switched path (MP2MP LSP) service connects all PE devices in a backbone network. Using the first MP2MP LSP, a PE device sends a notification packet carrying newly learned MAC addresses to all the other PE devices in the backbone network. Thus the PE devices do not flood the backbone network with unknown packets to learn new MAC address and network bandwidth is conserved.

In examples of the present disclosure, a unique VSI label is allocated to every VSIs on each PE device. The VSI label corresponds to all inbound VC LSPs in PWs of the same VSI. In other words, the inbound VC LSPs that belong to the same VSI on a PE share one VSI label. Thus resources are conserved as unique PW labels are not allocated to all the inbound VC LSPs of the PWs.

In examples of the present disclosure, a second MP2MP LSP service connects all the PE devices in one VPLS instance. Using this MP2MP LSP service, a PE device sends a broadcast packet to other PE devices in the same VPLS instance by sending the broadcast packet through the second MP2MP LSP, which transmits the broadcast packet to the other PE devices. Thus the PE device does not send copies of the same packet over PWs to the other PE devices, which conserves network bandwidth when parts of the PWs share a common physical link to a P router.

FIG. 1 shows a VPLS capable network 100 with in examples of the present disclosure. VPLS capable network 100 includes a customer site 102-1, a customer site 102-2, and a customer sites 102-4 (collectively as "customer sites 102") and a service provider's backbone network 104, such as an IP/MPLS network, connected to customer sites 102.

Customer sites 102 use layer 2 (data link layer) communication within each site. Customer sites 102 are connected by VPLS service. Customer site 102-1 includes a CE device 106-1, customer site 102-2 includes a CE device 106-2, and customer site 102-4 includes a CE device 106-4. Customer devices 106-1, 106-2, and 106-4 are part of a VPLS instance 107. Each customer site also includes PCs and servers (not shown).

Backbone network 104 includes PE devices 108-1, 108-2, and 108-4 (collectively as "PE devices 108") that are part of VPLS instance 107. PE device 108-1 is connected by an AC 110-1 to CE device 106-1, PE device 108-2 is connected by an ACs 110-2 to CE device 106-2, and PE device 108-4 is connected by an ACs 110-4 to CE device 106-4.

PE device 108-1 includes a VSI 112-1, PE device 108-2 includes a VSI 112-2, and PE device 108-4 includes a VSI 112-4. VSIs 112-1, 112-2, and 112-4 (collectively as "VSIs 112") are part of VPLS instance 107. VSI 112-1 is connected by PWs 114 and 116 to VSIs 112-2 and VSI 112-4, respectively. Under manual or automatic configuration, VSI 112-1 allocates the same VSI label 118 for the inbound VC LSPs in PWs 114 and 116. VSI 112-2 is connected by PWs 114 and 120 to VSIs 112-1 and 112-4, respectively. VSI 112-2 allocates the same VSI label 122 for inbound VC LSPs in PWs 114 and 120. VSI 112-4 is connected by PWs 116 and 120 to VSIs 112-1 and 112-2, respectively. VSI 112-4 allocates the same VSI label 124 for inbound VC LSPs in PWs 116 and 120 from PE device.

For clarity's sake, each PE device is shown to be connected by one AC to one CE device in one customer site. However, each PE device may be connected by multiple ACs to multiple CE devices in multiple customer sites that are connected by VPLS service to be part of VPLS instance 107.

PE devices 108-1, 108-2, and 108-4 may include VSIs of other VPLS instances. VPLS capable network 100 may include other customer sites that are part of other VPLS instance, such as a customer site 102-3. Backbone network 104 may include other PE devices and VSIs that are part of other VPLS instances, such as a PE device 108-3 including a VSI 112-3. PE device 108-3 is connected by an AC 110-3 to a CE device 106-3 in customer site 102-3.

A first MP2MP LSP, not shown in FIG. 1 for clarity's sake, connects all the PE devices in backbone network 104 to provide a communication channel to exchange protocol packets. The PE devices run a control protocol 126, which includes a VPLS MAC address routing protocol to learn MAC addresses on the control plane through the first MP2MP LSP. For each VSI, control protocol 126 stores MAC address information in a path database (e.g., path database 128 for VSI 112-1) on the control plane. Each VSI also has a MAC address table (e.g., MAC address table 130 for VSI 112-1) on the data plane that is updated with the corresponding path database 128. Control protocol 126 generates notification packets (e.g., notification packet 132 for VSI 112-1) about new MAC addresses and cancellation packets (e.g., cancellation packet 134 for VSI 112-1) about expired MAC addresses. The PE devices may also use an automatic discovery protocol, such as BGP, to discover other PE devices of the same VPLS instances over the first MP2MP LSP.

The first MP2MP LSP may be implemented according to RFC 6388. The first MP2MP LSP includes a root node, which may be a P router or a PE device in backbone network 104. Other than the root node, all other PE devices in backbone network 104 are leaf nodes in the first MP2MP LSP. When the root node receives a broadcast or multicast packet from a leaf node, the root node performs multicast replication by copying and broadcasting the broadcast packet to the other leaf nodes. For example, the root node replaces a tunnel label of the broadcast packet with labels necessary to forward the broadcast packet to the other leaf nodes.

Figure 2:
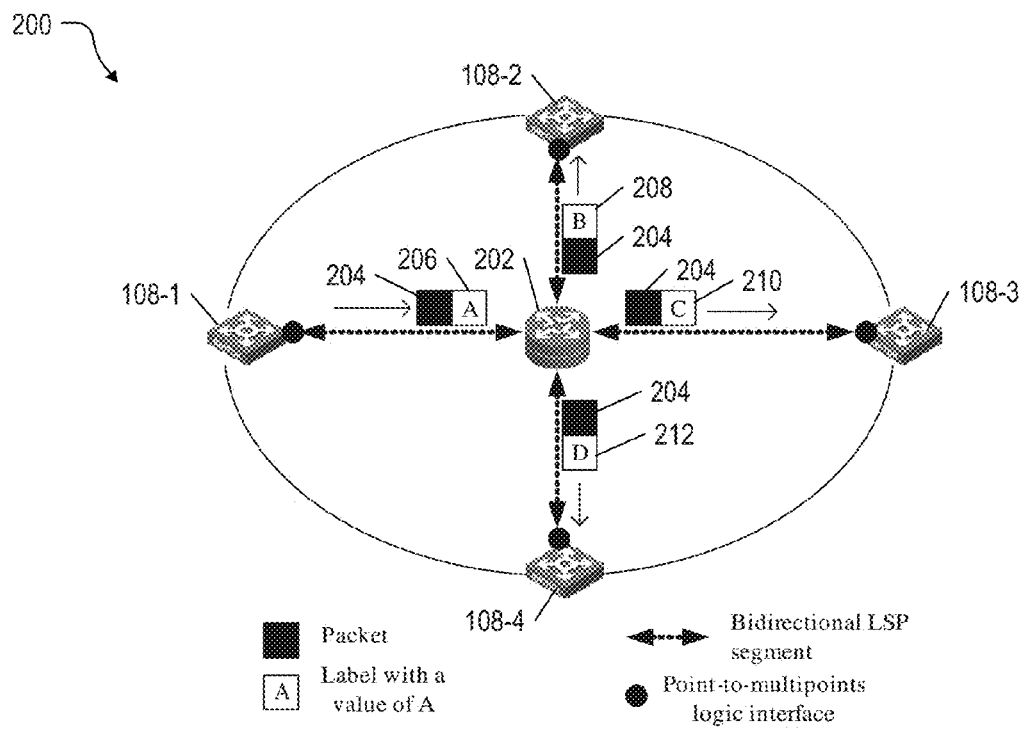
FIG. 2 shows a first MP2MP LSP that connects all PE devices of a backbone network of FIG. 1 in examples of the present disclosure.

FIG. 2 shows a first MP2MP LSP service 200 connecting all the PE devices of backbone network 104 (FIG. 1) in examples of the present disclosure. First MP2MP LSP 200 includes a root node 202 that is a P router. Rote node 202 is connected to leaf nodes of PE devices 108-1, 108-2, 108-3, and 108-4 through bidirectional LSP segments, also known as sub-LSPs. Assume root node 202 receives a broadcast packet 204 with a tunnel label 206 from PE device 108-1. In response, root node 202 copies broadcast packet 204 and replaces tunnel label 206 with tunnel labels 208, 210, and 212 to send broadcast packet 204 to PE devices 108-2, 108-3, and 108-4, respectively.

Figure 3:
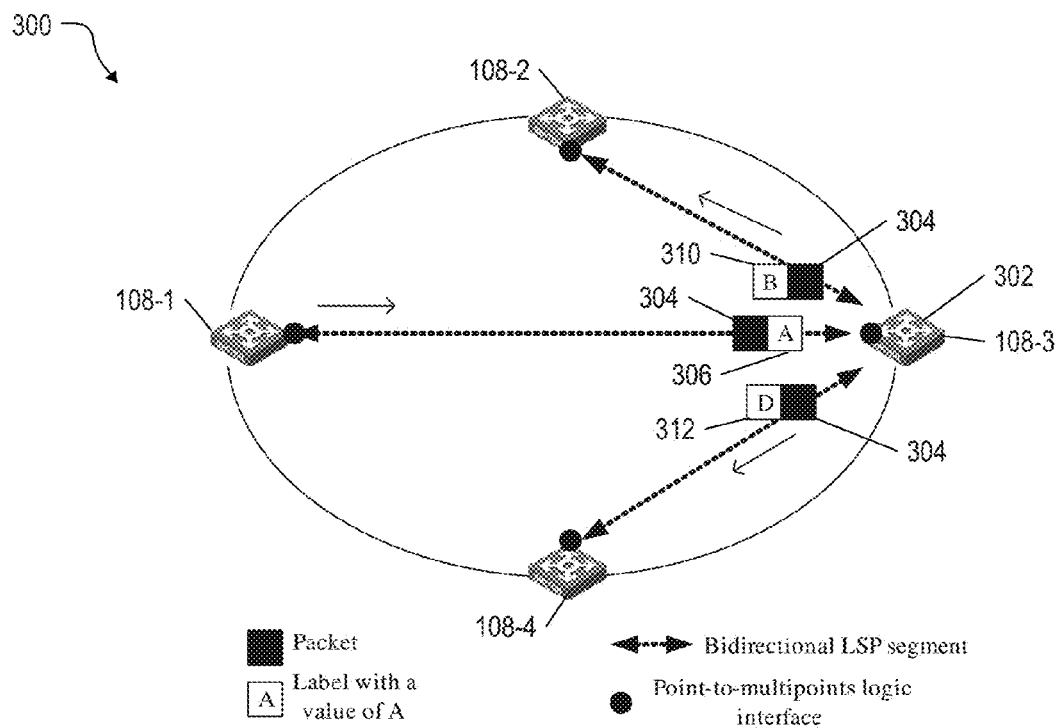
FIG. 3 shows a first MP2MP LSP that connects all the PE devices of the backbone network of FIG. 1 in other examples of the present disclosure.

FIG. 3 shows a first MP2MP LSP service 300 connecting all the PE devices of backbone network 104 (FIG. 1) in examples of the present disclosure. In first MP2MP LSP 300, PE device 108-3 serves as a root node 302. Rote node 302 is connected leaf nodes of PE devices 108-1, 108-2, and 108-4 through bidirectional LSP segments. Assume root node 302 receives a broadcast packet 304 with tunnel label 306 from PE 108-1. Broadcast packet 304 may be a notification packet or a cancellation packet. In response, root node 302 copies broadcast packet 304 and replaces tunnel label 306 with tunnel labels 310 and 312 to send broadcast packet 304 to PE devices 108-2 and 108-4, respectively.

To support broadcasting and multicasting, each VPLS instance is provided with a second MP2MP LSP service, which is not shown in FIG. 1 for clarity's sake. Note that multicasting is treated as broadcasting in VPLS. The second MP2MP LSP differs from the first MP2MP LSP. While the first MP2MP LSP includes all the PE devices in backbone network 104 (FIG. 1), the second MP2MP LSP includes all PE devices in a particular VPLS instance. For example, a second MP2MP LSP connects all PE devices 108 (FIG. 1) in VPLS instance 107 (FIG. 1). PE devices 108 run control protocol 126, which includes a VPLS broadcasting protocol to broadcast packets on the control plane through the second MP2MP LSP. As described above, the PE devices in backbone network 104 may use an automatic discovery protocol, such as BGP, to discover other PE devices of the same VPLS instances over the first MP2MP LSP.

Figure 4:
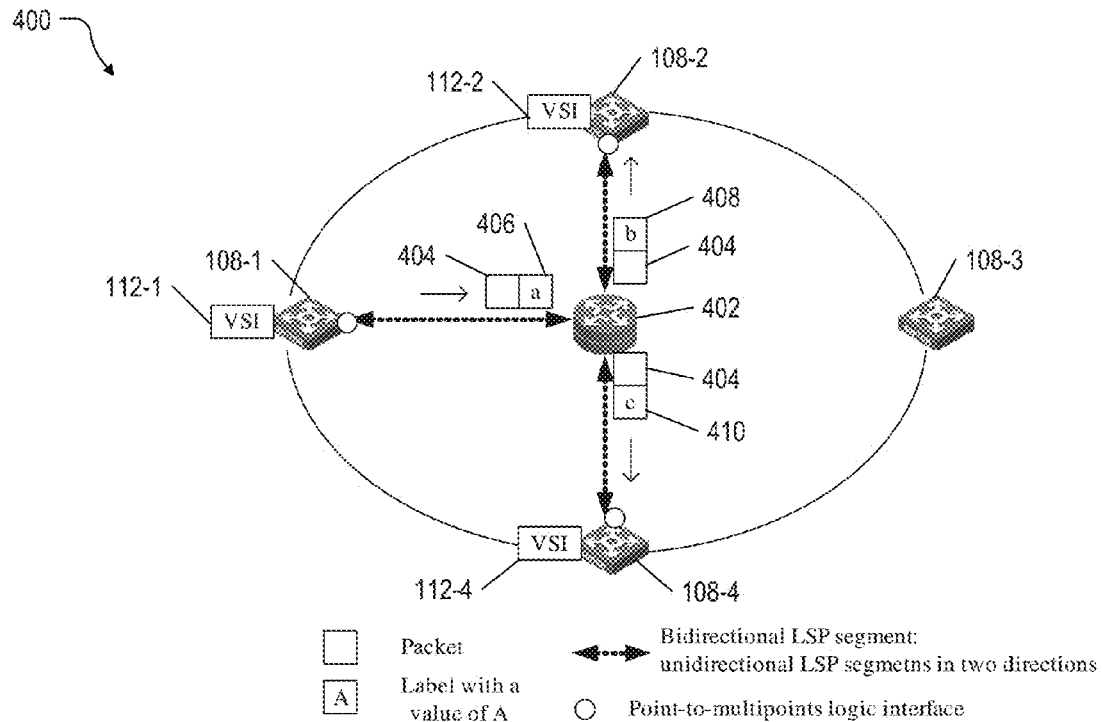
FIG. 4 shows a second MP2MP LSP that connects all PE devices of the VPLS instance of FIG. 1 in examples of the present disclosure.

FIG. 4 shows a second MP2MP LSP service 400 for VPLS instance 107 (FIG. 1) in examples of the present disclosure. MP2MP LSP 400 includes a P router root node 402 that is a connecting all the PE devices 108 of VPLS instance 107. In other examples, root node 402 may be a PE device. Assume PE device 108-1 receives a broadcast or multicast packet 404 from an AC, and PE device 108-1 maps the AC to VSI 112-1 (FIG. 1), which is part of VPLS instance 107. PE device 108-1 then maps VPLS instance 107 to MP2MP LSP 400 and sends broadcast packet 404 with tunnel label 406 to root node 402 of MP2MP LSP 400. Root node 402 then copies and broadcasts packet 404 to all the other leaf nodes in MP2MP LSP 400. For example, root node 402 copies broadcast packet 404 and replaces tunnel label 406 with tunnel labels 408 and 410 to send broadcast packet 404 to PE devices 108-2 and 108-4, respectively.

Figure 5:
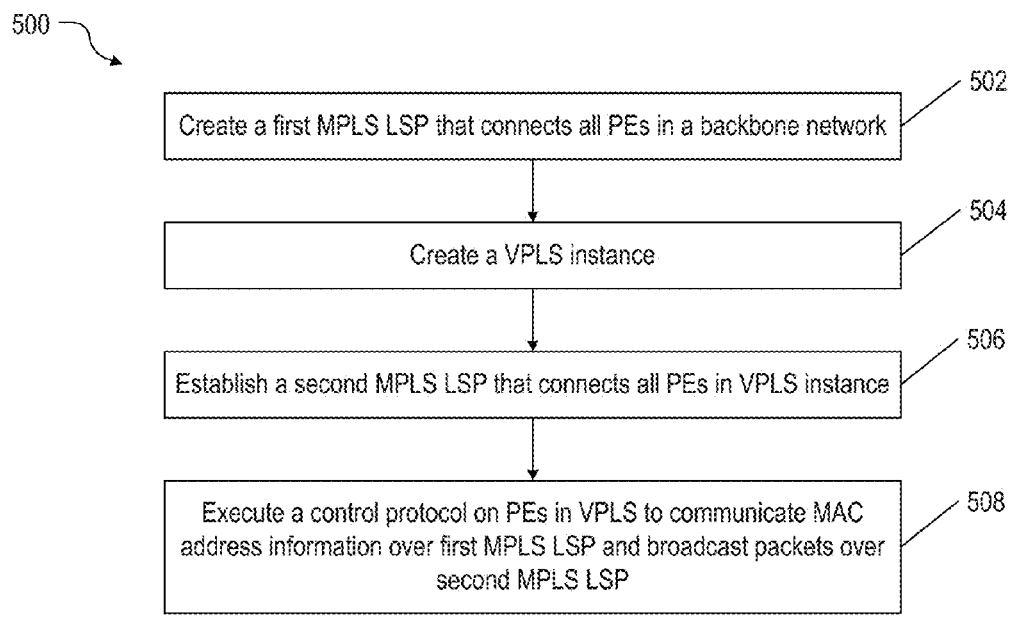
FIG. 5 is a flowchart of a method to implement the VPLS instance of FIG. 1 in examples of the present disclosure.

FIG. 5 is a flowchart of a method 500 to implement VPLS instance 107 (FIG. 1) in VPLS capable network 100 (FIG. 1) in examples of the present disclosures. In any method described in the present disclosure, although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Method 500 may begin in block 502.

In block 502, a first MP2MP LSP service is created to connect all the PE devices 108-1, 108-2, 108-3, and 108-4 (FIG. 1) in backbone network 104. First MP2MP LSP may be manually configured. The first MP2MP LSP may be first MP2MP LSP 200 or 300 (FIG. 2 or 3). Block 502 may be followed by block 504.

In block 504, VPLS instance 107 is created. PE devices 108 may automatically discover each other using an automatic discovery protocol, such as BGP, over the first MP2MP LSP. PE devices 108 create VSIs 112 that are part of VPLS instance 107, associate VSIs 112 with VPLS instance 107 (for example to its VPLS ID), and allocate VSI labels 118, 122, and 124 (FIG. 1) to VSIs 112-1, 112-2, and 112-4 (FIG. 1), respectively. ACs may be manually associated with VSIs 112 on PE devices 108.

PE devices 108 may communicate over the first MP2MP LSP to establish PWs between VSIs 112. For example, PE devices 108-1 and 108-2 establish PW 114 (FIG. 1) between VSI 112-1 and 112-2, PE devices 108-1 and 108-4 establish PW 116 (FIG. 1) between VSI 112-1 and 112-4, and PE devices 108-2 and 108-4 establish PW 120 (FIG. 1) between VSI 112-2 and 110-2.

To establish a PW between VSIs on two PE devices, each PE device communicates a VSI label that the opposing PE device on the other end of the PW is to use to send packets to the VSI of the PE device. For example, (1) PE device 108-1 instructs PE devices 108-2 and 108-4 to use VSI label 118 to send packets to VSI 112-1 of PE device 108-1, (2) PE device 108-2 instructs PE devices 108-1 and 108-4 to use VSI label 122 to send packets to VSI 112-2 of PE device 108-2, and (3) PE device 108-4 instructs PE devices 108-1 and 108-4 to use VSI label 124 to send packets to VSI 112-4 of PE device 108-4. As can be seen, each VSI uses the same VSI label for all inbound VC LSPs instead of unique PW labels. Block 504 may be followed by block 506.

In block 506, a second MP2MP LSP service is created to connect all PE devices 108 in VPLS instance 107. Second MP2MP LSP may be manually or automatically configured. The second MP2MP LSP may be second MP2MP LSP 400 (FIG. 4). Block 506 may be followed by block 508.

In block 508, PE devices 108 in VPLS instance 107 execute control protocol 126 (FIG. 1) to communicate MAC address information over the first MP2MP LSP and broadcast packets over the second MP2MP LSP.

Figure 6:
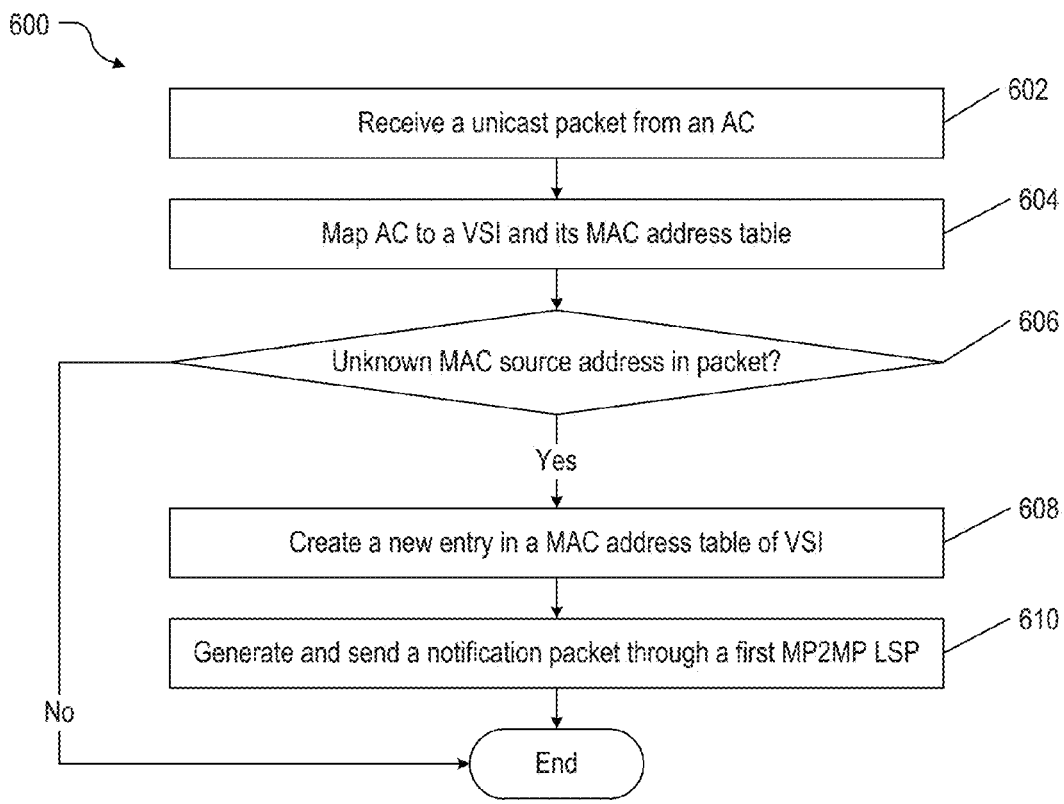
FIG. 6 is a flowchart of a method for a PE device to create a notification message in examples of the present disclosure.

FIG. 6 is a flowchart of a method 600 for a PE device to create a notification message about a newly learned MAC address on the control plane in examples of the present disclosure. Note that a method for the same PE to forward packets on the data plane is described later. To demonstrate method 600, assume PE device 108-1 (FIG. 1) receives a packet from AC 110-1 (FIG. 1). The packet may be a unicast, multicast, or broadcast packet. Method 600 may begin in block 602.

In block 602, PE device 108-1 receives the packet from AC 110-1. Block 602 may be followed by block 604.

In block 604, PE device 108-1 maps AC 110-1 to VSI 112-1 (FIG. 1), which is part of VPLS instance 107 (FIG. 1), and its MAC address table. Block 604 may be followed by block 606.

In block 606, PE device 108-1 determines if the packet has an unknown MAC source address. Specifically PE device 108-1 looks for a matching entry with the same MAC address in the MAC address table of VSI 112-1. If the packet has an unknown MAC source address, block 606 may be followed by block 608. Otherwise method 600 may end.

In block 608, PE device 108-1 creates a new entry for the MAC address in the MAC address table on the data plane. PE 108-1 may optionally create a new entry for the MAC address in a path database (explained later) on the control plane. Block 608 may be followed by block 610.

In block 610, PE device 108-1 generates and sends a notification packet to the first MP2MP LSP, and the root node of the first MP2MP LSP copies and multicasts the notification packet to the other PE devices in backbone network 104. The notification packet may have the format shown in Table 1 in examples of the present disclosure. After block 610, method 600 may end.

TABLE 1

| PE ID of the source PE sending the notification message | VPLS ID of the VPLS instance of the VSI | VSI label of the VSI | One or more MAC addresses |
|---|---|---|---|

When the data flow is unidirectional from a PE device through an AC to a CE device in a customer site, the PE device cannot learn MAC addresses from the AC. MAC addresses of machines in that customer site may be manually provided to the PE device, and the PE device may notify the other PE devices of these MAC addresses through the first MP2MP LSP.

Figure 7:
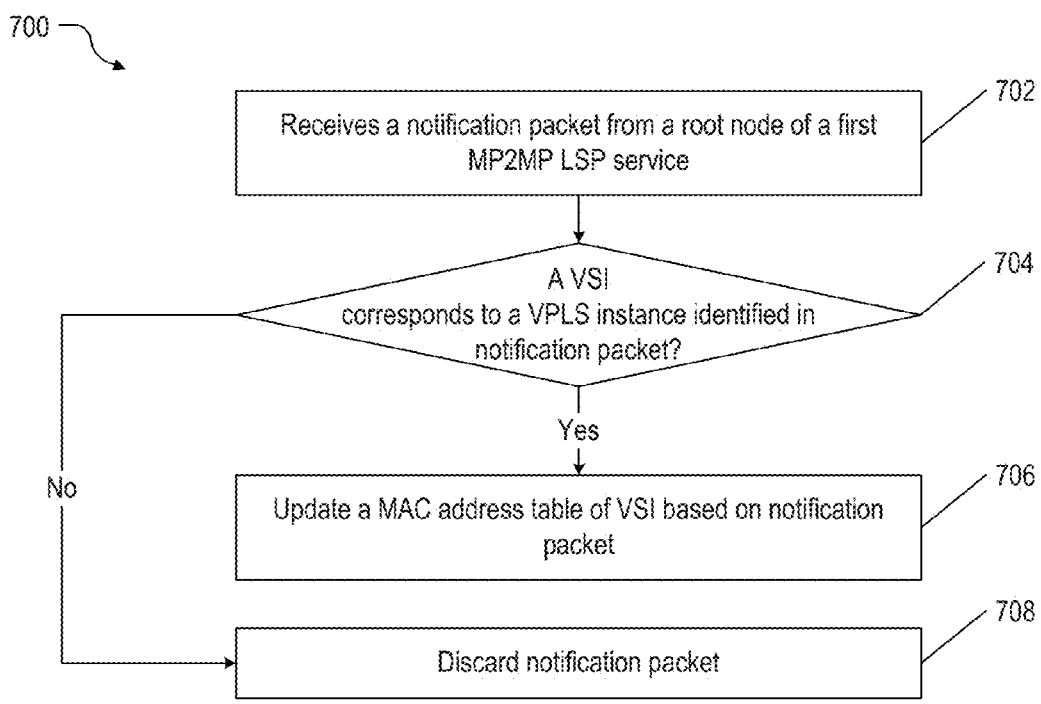
FIG. 7 is a flowchart of a method for a PE device to learn a new MAC address through a notification packet in examples of the present disclosure.

FIG. 7 is a flowchart of a method 700 for a PE device to learn a new MAC address through a notification packet in examples of the present disclosure. To demonstrate method 700, assume PE device 108-2 (FIG. 1) receives a notification packet from the root node of a first MP2MP LSP. Method 700 may begin in block 702.

In block 702, PE device 108-2 device receives a notification packet from the root node of the first MP2MP LSP. As shown in Table 1 above, the notification packet identifies the source PE device of the notification packet by a PE ID, the VPLS instance by a VPLS ID, the VSI on the source PE device by a VSI label, and one or more MAC addresses. Block 702 may be followed by block 704.

In block 704, PE 108-2 determines if it has a VSI of the VPLS instance identified in the notification packet. For example, PE 108-2 checks to see of any of its VSIs are associated with the VPLS ID listed in the notification packet. If so, block 704 may be followed by block 706. Otherwise block 704 may be followed by block 708.

In block 706, PE 108-2 updates a MAC address table of a VSI associated with the VPLS instance identified in the notification packet (e.g., VSI 112-2). For example, PE 108-2 first creates an entry in a path database of VSI 112-2 on the control plane based on the notification packet. PE device 108-2 then updates the MAC address table of VSI 112-2 on the data plane based on information in the path database. The path database may have the format shown in Table 2 and the MAC address table may have the format shown in Tables 3 and 4 in examples of the present disclosure.

TABLE 2

| MAC Address | VSI Label | Opposing PE | Tunnel ID |
|---|---|---|---|
| MAC1 | VSI Label 1 | PE1 | Tunnel 5 |

TABLE 3

| MAC | Path/Port (+VLAN) |
|---|---|
| MAC1 | Path1 (or Port1) |

TABLE 4

| Path Identifier | VSI Label | Tunnel Package |
|---|---|---|
| Path1 | VSI Label 1 | Tunnel Label<br>Output interface<br>Next hop |

Note that on the control plane, PE 108-2 maintains and manages a path database for each VSI on the PE. A path database stores MAC address information for one VSI. On the data plane, PE 108-2 maintains and manages a MAC address table for each VSI on the PE. The MAC address table of a VSI may be updated based on the path database of the same VSI as soon as information in the path database is updated (e.g., entries created, deleted, and changed).

As backbone network 104 has a full mesh of tunnels (MPLS or GRE) between all the PE devices, a device may select at least one tunnel for each VSI at the PE device to communicate with a VSI of the same VPLS instance at an opposing PE device. The PE device may select the tunnel based on a predefined rule for the opposing PE device. Thus PE device 108-2 selects a tunnel for VSI 112-2 to communicate with a VSI of VPLS instance 107 on the source PE identified in the notification packet. PE device 108-2 includes the tunnel ID in the path database.

A PE device may select a tunnel for the opposing PE device on the other end of a PW after receiving a notification packet for the very first time from the opposing PE. Afterwards the PE device does not need to select a tunnel again for future notification packets concerning the VSI of the same VPLS instance from the opposing PE device. In some examples, the PE device selects a tunnel for each newly learned MAC address with respect to the same VPLS from the opposing PE device.

After block 706, method 700 may end.

In block 708, PE device 108-2 discards the notification message as it does not have a VSI associated with the VPLS instance identified in the notification message. After block 708, method 700 may end.

Figure 8:
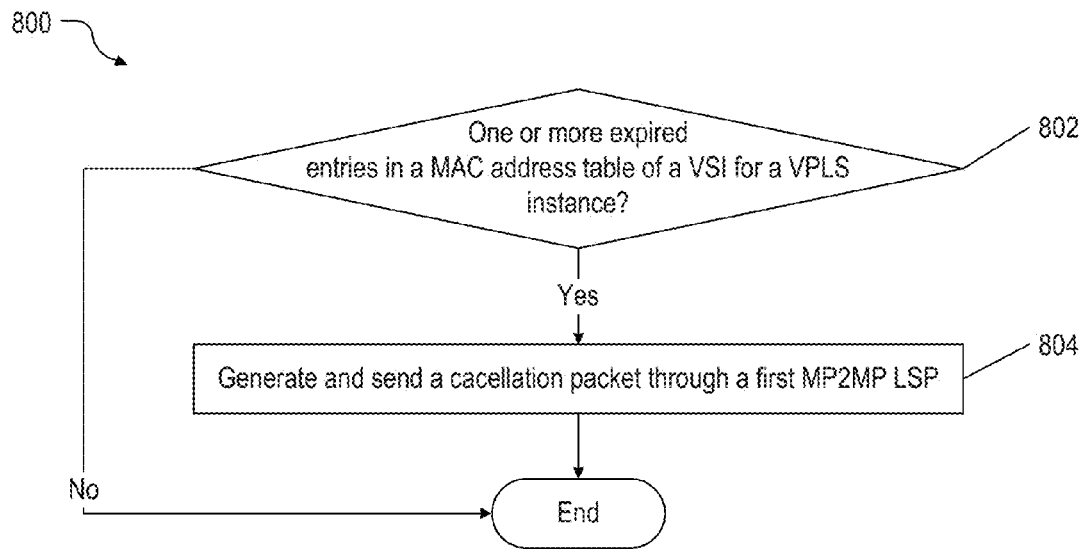
FIG. 8 is a flowchart of a method for a PE device to create a cancellation message in examples of the present disclosure.

FIG. 8 is a flowchart of a method 800 for a PE device to create a cancellation message about an expired MAC address in examples of the present disclosure. To demonstrate method 800, assume PE device 108-1 (FIG. 1) has an expired entry in the MAC address table of VSI 112-1 (FIG. 1). Method 800 may begin in block 802.

In block 802, PE device 108-1 determines if one or more entries in the MAC address table of VSI 112-1 have expired. If so, block 802 may be followed by block 804. Otherwise method 800 may end.

In block 804, PE device 108-1 generates and creates a cancellation message to the first MP2MP LSP, and the root node of the first MP2MP LSP copies and multicasts the cancellation packet to the other PE devices in backbone network 104 (FIG. 1). The cancellation packet may have the format shown in Table 5 in examples of the present disclosure. After block 804, method 800 may end.

TABLE 5

| PE ID of the<br>source PE sending<br>the cancellation<br>message | VPLS ID of the<br>VPLS instance<br>of the VSI | One or more<br>MAC<br>addresses |
|---|---|---|

Figure 9:
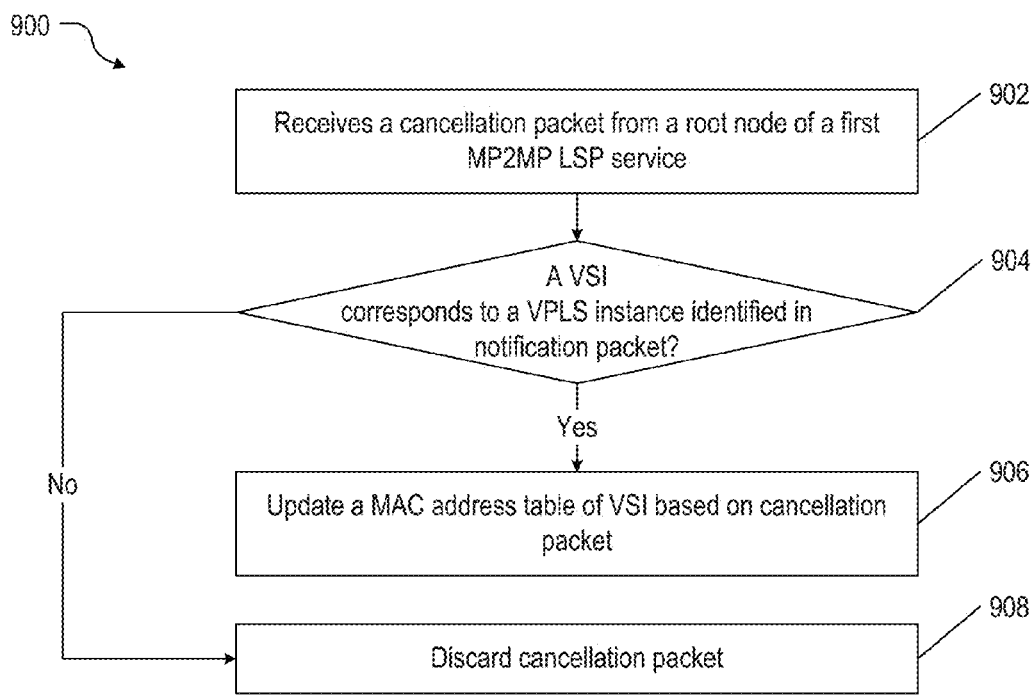
FIG. 9 is a flowchart of a method for a PE device to withdraw a MAC address in response to a cancellation packet in examples of the present disclosure.

FIG. 9 is a flowchart of a method 900 for a PE device to withdraw a MAC address in response to a cancellation packet in examples of the present disclosure. To demonstrate method 900, assume PE device 108-2 (FIG. 1) receives a cancellation packet from the root node of a first MP2MP LSP. Method 900 may begin in block 902.

In block 902, PE device 108-2 receives a cancellation message from the root node of the first MP2MP LSP. As shown in Table 5 above, the cancellation message identifies the source PE device of the cancellation packet by a PE ID, the VPLS instance by a VPLS ID, and one or more MAC address. Block 902 may be followed by block 904.

In block 904, PE device 108-2 determines if it has a VSI of the VPLS instance identified in the notification packet. For example, PE 108-2 checks to see of any of its VSIs are associated with the VPLS ID listed in the notification packet. If so, block 904 may be followed by block 906. Otherwise block 904 may be followed by block 908.

In block 906, PE 108-2 updates a MAC address table of a VSI associated with the VPLS instance identified in the cancellation packet (e.g., VSI 112-2). For example, PE device 108-2 first removes the corresponding entry in the path database of VSI 112-2 on the control plane. PE device 108-2 then updates the MAC address table of VSI 112-2 with the information in the path database by removing the corresponding entry in the MAC address table. In some examples, PE device 108-2 immediately updates the MAC address table after the path database is updated. After block 906, method 900 may end.

In block 908, PE device 108-2 discards the cancellation message as it does not have a VSI associated with the VPLS ID identified in the cancellation message. After block 908, method 900 may end.

The notification and the cancellation messages may be packaged in various existing protocol messages. For example, in an IP/MPLS backbone network, the notification and the cancellation messages may be implemented by expanding on the intermediate system-to-intermediate system (IS-IS) protocol messages. In the MPLS Transport Profile (TP) network, the notification and the cancellation messages are implemented by sending messages using the MPLS generic associated channel (G-ACH) by defining a new type of MPLS TP ACH channel type for carrying the messages.

Figure 10:
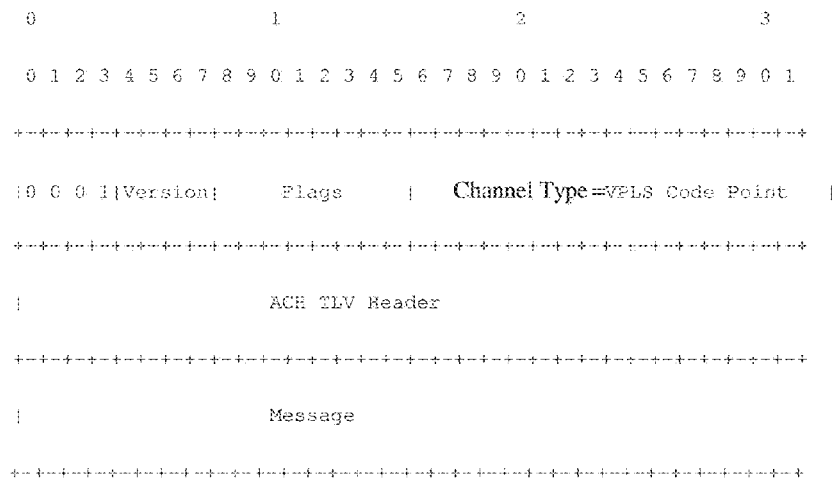
FIG. 10 shows the format of a G-ACH notification or cancellation message in examples of the present disclosure.

FIG. 10 shows the format of a G-ACH notification or cancellation message in examples of the present disclosure. The channel type in the message is set to a VPLS code point for indicating a notification or a cancellation message. The message carries the contents of the notification or the cancellation message.

Figure 11:
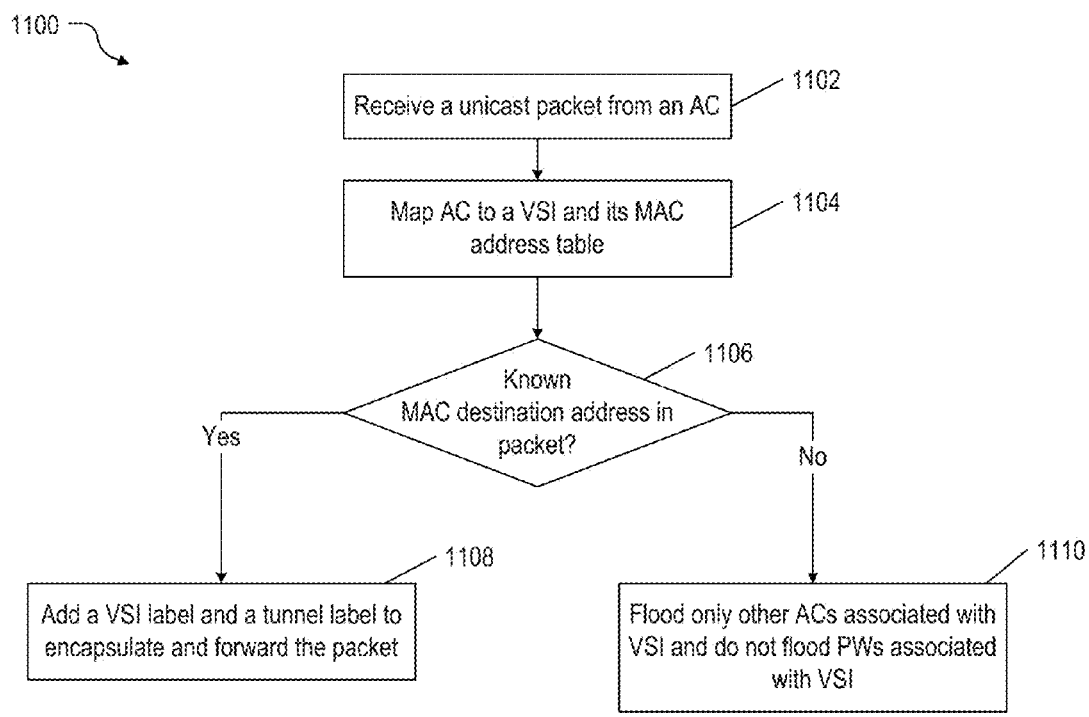
FIG. 11 is a flowchart of a method for a PE device to forward a unicast packet received from an AC in examples of the present disclosure.

FIG. 11 is a flowchart of a method 1100 for a PE device to forward a unicast packet received from an AC in examples of the present disclosure. To demonstrate method 1100, assume PE device 108-1 (FIG. 1) receives a unicast packet from AC 110-1 (FIG. 1). Method 1100 may begin in block 1102.

In block 1102, PE device 108-1 receives a unicast packet from AC 110-1. Block 1102 may be followed by block 1104.

In block 1104, PE device 108-1 maps AC 110-1 to VSI 112-1 (FIG. 1) and its MAC address table. Block 1104 may be followed by block 1106.

In block 1106, PE device 108-1 determines if the packet has a known MAC destination address. Specifically PE device 108-1 looks for a matching entry with the same MAC address in a path database of VSI 112-1. If the packet has a known MAC destination address, block 1106 may be followed by block 1108. Otherwise block 1106 may be followed by block 1110.

In block 1108, PE device 108-1 forwards the packet to the path or port (and VLAN) identified in the matching entry of the MAC address table of VSI 112-1. PE device 108-1 may add a VSI label and a tunnel label to encapsulate and forward the packet through a PW. After block 1108, method 1100 may end.

In block 1110, PE device 108-1 floods the unknown packet to all other ACs associated with the VSI 112-1. PE device 108-1 does not flood PWs 114 and 116 (FIG. 1) of VSI 112-1 in backbone network 104 with the unknown packet. As described, the PE devices learn MAC addresses through the control plane instead of the data plane. After block 1110, method 1100 may end.

Figure 12:
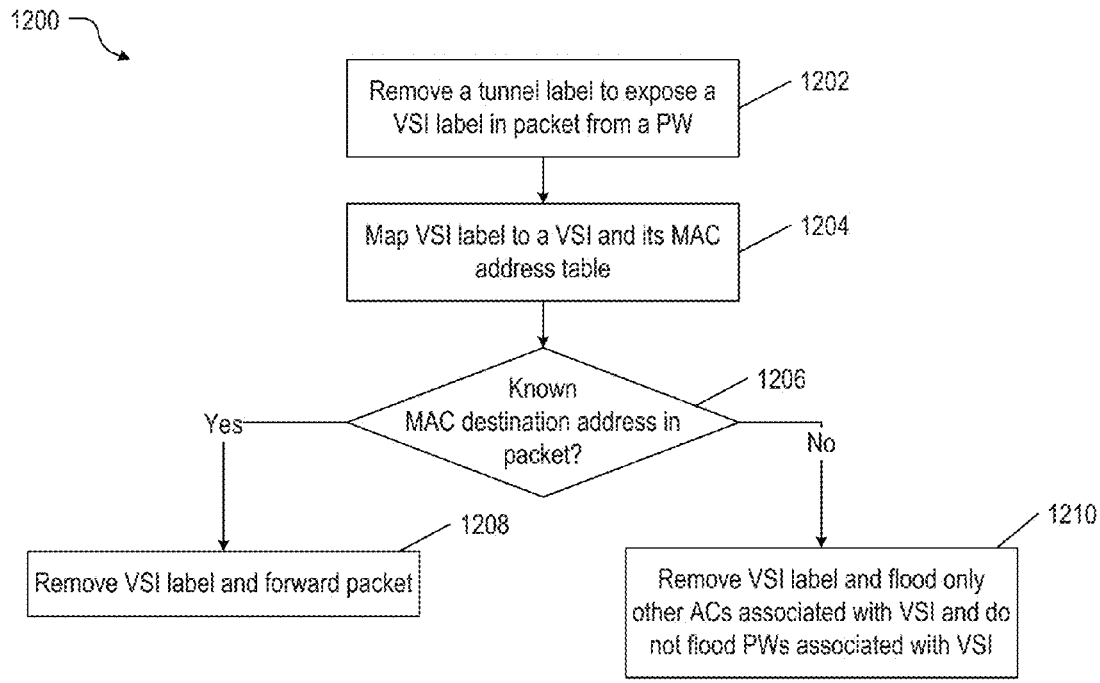
FIG. 12 is a flowchart of a method for a PE device to forward a packet received from an inbound VC LSP of a PW in examples of the present disclosure.

FIG. 12 is a flowchart of a method 1200 for a PE device to forward a unicast packet received from an inbound VC LSP of a PW in examples of the present disclosure. To demonstrate method 1200, assume PE device 108-1 (FIG. 1) receives a unicast packet on the inbound VC LSP of PW 114 (FIG. 1) from PE device 108-2 (FIG. 1) where PW 114 connects VSIs 112-1 and 112-2 (FIG. 1). Method 1200 may begin in block 1202.

In block 1202, PE device 108-1 receives a unicast packet from PW 114 and removes the tunnel label from the packet to expose VSI label 118 (FIG. 1). Block 1202 may be followed by block 1204.

In block 1204, PE device 108-1 maps VSI label 118 to VSI 112-1 and its MAC address table. Block 1204 may be followed by block 1206.

In block 1206, PE device 108-1 determines if the packet has a known MAC destination address. For example, PE device 108-1 looks for a matching entry with the same MAC address in the MAC address table of VSI 112-1. If the packet has a known MAC destination address, block 1206 may be followed by block 1208. Otherwise block 1208 may be followed by block 1210.

In block 1208, PE device 108-1 removes the VSI label and forwards the packet to the path or port (and VLAN) identified in the matching entry of the MAC address table of VSI 112-1. For example, device 108-1 adds a VSI label and a tunnel label to encapsulate and forward the packet. After block 1208, method 1200 may end.

In block 1210, PE device 108-1 removes the VSI label and floods the unknown packet to all the ACs associated with VSI 112-1. PE device 108-1 does not flood PWs 114 and 116 in backbone network 104 with the unknown packet. After block 1210, method 1200 may end.

Figure 13:
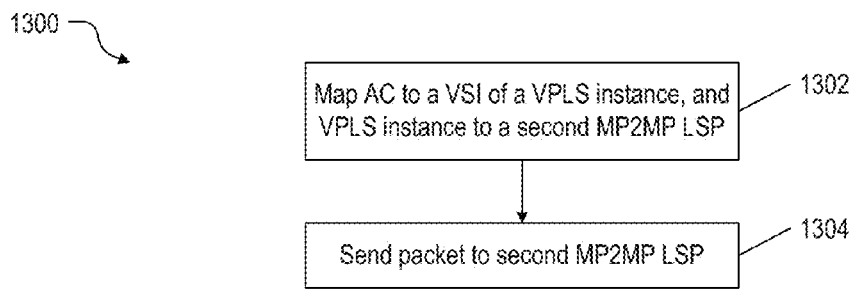
FIG. 13 is a flowchart of a method for a PE device to broadcast a packet over a second MP2MP LSP in examples of the present disclosure.

FIG. 13 is a flowchart of a method 1300 for a PE device to broadcast a packet over a second MP2MP LSP in examples of the present disclosure. To demonstrate method 1300, assume PE device 108-1 (FIG. 1) receives a broadcast or multicast packet 404 (FIG. 4) from AC 110-1 (FIG. 1). Method 1300 may begin in block 1302.

In block 1302, PE device 108-1 maps AC 110-1 to VSI 112-1, which is part of VPLS instance 107. PE device 108-1 then maps VPLS instance 107 to a second MP2MP LSP, such as MP2MP LSP 400 (FIG. 4). Block 1302 may be followed by block 1304.

In block 1304, PE device 108-1 sends packet 404 with tunnel label 406 to root node 402 (FIG. 4) of second MP2MP LSP 400. Root node 402 then copies and broadcasts t packet 404 to all the other leaf nodes in MP2MP LSP 400. Referring to FIG. 4, root node 402 copies packet 404 and replaces tunnel label 406 with tunnel labels 408 and 410 to send packet 404 to PE devices 108-2 and 108-4, respectively.

Figure 14:
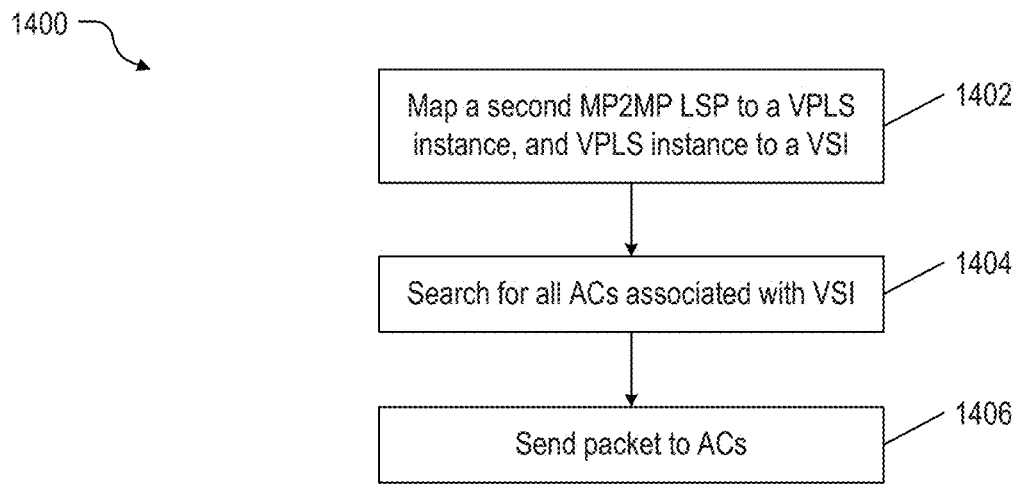
FIG. 14 is a flowchart of a method for a PE device to broadcast a packet received from a second MP2MP LSP in examples of the present disclosure.

FIG. 14 is a flowchart of a method 1400 for a PE device to broadcast a packet received from a second MP2MP LSP in examples of the present disclosure. To demonstrate method 1400, assume PE 108-2 (FIG. 1) receive broadcast packet 404 (FIG. 4) from a second MP2MP LSP 400 (FIG. 4). Method 1400 may begin in block 1402.

In block 1402, PE 108-2 maps MP2MP LSP 400 (for example to its MP2MP LSP ID) to VPLS instance 107 (FIG. 1), and then VPLS instance 107 to VSI 112-2 and its MAC address table. Block 1402 may be followed by block 1404.

In block 1404, PE device 108-2 searches the MAC address table of VSI 112-2 for all the ACs associated with VSI 112-2. Block 1404 may be followed by block 1406.

In block 1406, PE device 108-2 broadcasts packet 404 to all the ACs.

Figure 15:
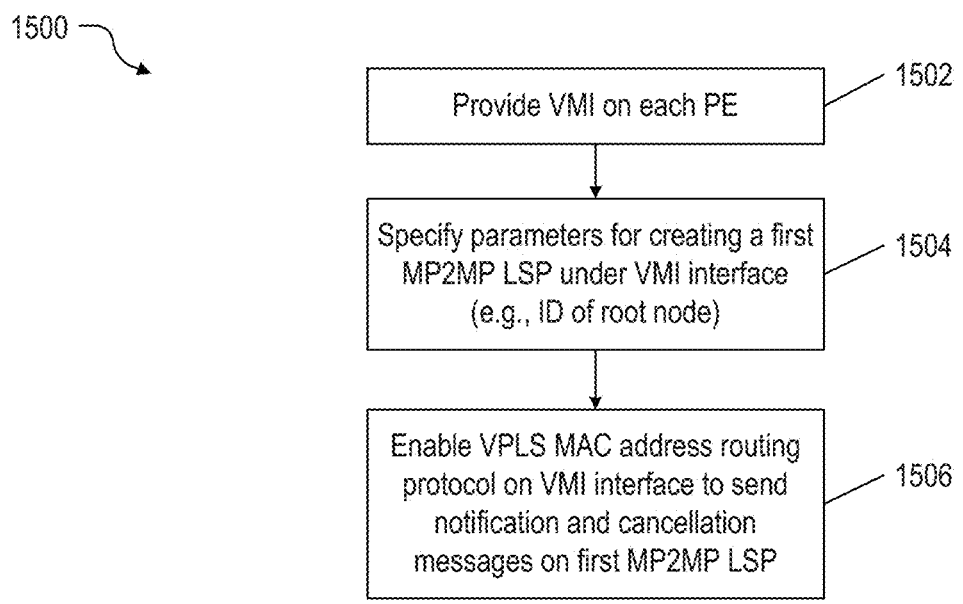
FIG. 15 is a flowchart of a method to create a first MP2MP LSP over a backbone network in examples of the present disclosure.

FIG. 15 is a flowchart of a method 1500 to create a first MP2MP LSP service over a backbone network, such as backbone network 104 in FIG. 1, in examples of the present disclosure. The first MP2MP LSP may be MP2MP LSP 200 or 300 (FIG. 2 or 3). Method 1500 may begin in block 1502.

In block 1502, a virtual multicast interface (VMI) is created on each PE device in backbone network 104. Block 1502 may be followed by block 1504.

In block 1504, parameters are specified to create the first MP2MP LSP. These parameters may include a root node ID (e.g., an IP address), which identifies a device as the root node of the first MP2MP LSP that is connected to all the PE devices in backbone network 104.

The VMIs are associated with the first MP2MP LSP. For example, each PE associates its VMI with a next hop label forwarding entries (NHLFE) to the first MP2MP LSP, which is used to send VPLS MAC address routing protocol packets (e.g., the notification and the cancellation packets). The NHLFE includes an output label, an output interface (actual physical interface), and a next hop. Local labels are established to map the VMIs to the first MP2MP LSP, which are used to receive the VPLS MAC address routing protocol packets. For example, each PE device allocates a local label for its VMI, and distributes the local label to establish inbound direction of bidirectional LSP segment of MP2MP LSP to receive the VPLS MAC address routing protocol packets.

To send a VPLS MAC address routing protocol packet through the first MP2MP LSP, a PE device uses its VMI to find a NHLFE for the first MP2MP LSP and the VPLS MAC address routing protocol packet is sent based on the information in the matching NHLFE. Thus the VPLS MAC address routing protocol packet is sent to the root node through the first MP2MP LSP, and more specifically through the LSP segments between the local PE and the root node.

Once the VPLS MAC address routing protocol packet is received, it is processed based on the local label carried in the VPLS MAC address routing protocol packet. If the VMI listed in the local label carried in the packet is the VMI that received the packet, then the correct that VMI has been found. Hence, the PE with the VMI can send packets from the VMI to the root node via the first MP2MP LSP. Afterward, the VMI may also receive packets from the first MP2MP LSP. Block 1504 may be followed by block 1506.

In block 1506, VPLS MAC address routing protocol 126 (FIG. 1) is enabled on the VMIs to send and receive notification and cancellation packets through the first MP2MP LSP.

As soon a PE device is added as a leaf node of the first MP2MP LSP, the PE device uses LDP to create bidirectional LSP segment between the PE device and the root node. The bidirectional LSP segment consist of two unidirectional LSPs in opposite directions (an upstream LSP to send a message and a downstream LSP to receive a message). After the LSP segment has been created, the VMI enters an operational state.

Figure 16:
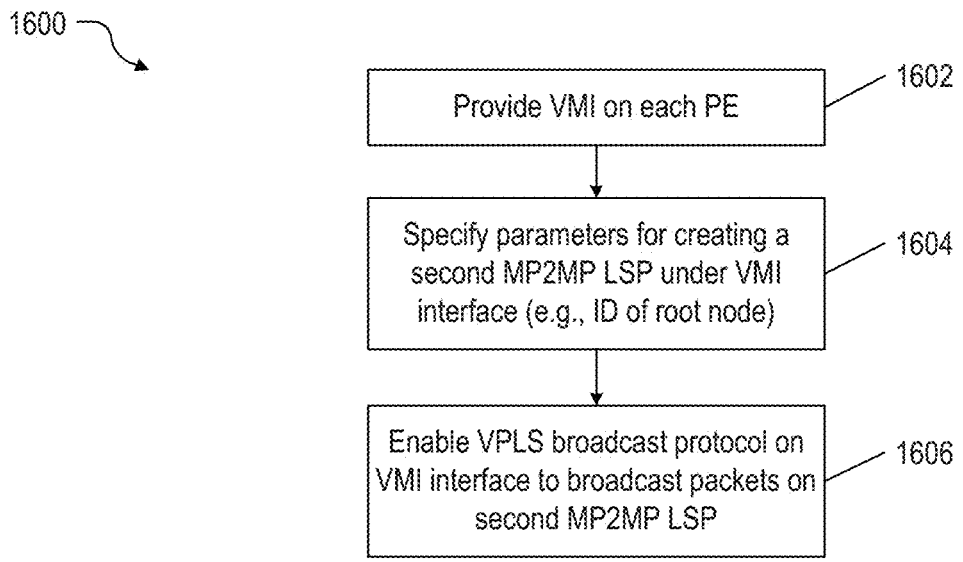
FIG. 16 is a flowchart of a method to create a second MP2MP LSP over a backbone network in examples of the present disclosure.

FIG. 16 is a flowchart of a method 1600 to create second MP2MP LSP 400 (FIG. 4) to broadcast packets in VPLS instance 107 (FIG. 1) in examples of the present disclosure. Method 1600 may begin in block 1602.

In block 1602, a VMI is provided on each PE device in VPLS instance 107. Block 1602 may be followed by block 1604.

In block 1604, parameters are specified to create second MP2MP LSP 400. These parameters may include a root node ID (e.g., as an IP address), which identifies a device as the root node of second MP2MP LSP 400 that is connected to all the PE devices 108 (FIG. 1) VPLS instance 107

The VMIs are associated with second MP2MP LSP 400. For example, each PE associates its VMI with a NHLFE, which is used to send broadcast packets. The NHLFE includes an output label, an output interface (actual physical interface), and next hop. Local labels are also established to map the VMIs to the second MP2MP LSP 400, which are used to receive the broadcast packets. Each PE device allocates a local label for its VMI, and distributes the local label to establish inbound direction of bidirectional LSP segment of MP2MP LSP.

To send a broadcast packet through second MP2MP LSP 400, a PE device uses its VMI to find a NHLFE for the second MP2MP LSP and the broadcast packet is sent based on the information in the NHLFE. Thus the broadcast packet is sent to the root node through the second MP2MP LSP, and more specifically through the LSP segments between the local PE and the root node.

Once the broadcast packet is received, it is processed based on the local label carried in the broadcast packet. If the VMI listed in the local label carried in the broadcast packet is the VMI that received the packet, then the correct VMI has received the broadcast packet. Hence, the PE with the VMI can send packets from the VMI to the root node via second MP2MP LSP 400 to broadcast packets. Afterward, the VMI may also receive broadcast packets from second MP2MP LSP 400.

In block 1606, VPLS broadcasting protocol 126 (FIG. 1) is enabled on the VMIs to broadcast packets through the second MP2MP LSP.

As soon as a PE device is added as a leaf node of a second MP2MP LSP for a VPLS instance, the PE device uses LDP to create bidirectional LSP segment between the PE device and the root node. The bidirectional LSP segment consist of two unidirectional LSPs in opposite directions (an upstream LSP to send a message and a downstream LSP to receive a message). After the LSP segment has been created, the VMI enters an operational state.

Figure 17:
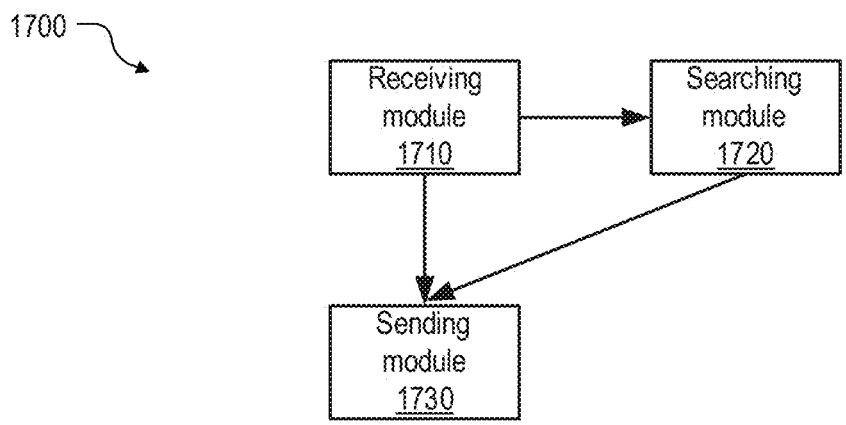
FIG. 17 is a block diagram of a PE device in examples of the present disclosure.

FIG. 17 is a block diagram of a PE device 1700 in examples of the present disclosure. PE device 1700 includes a receiving module 1710, a searching module 1720, and a sending module 1730.

Receiving module 1710 is to receive a unicast packet from an AC. Searching module 1720 is to search a MAC address forwarding table of a VSI associated with the AC for an entry that matches the MAC destination address carried by the unicast packet. If searching module 1720 does not find a matching entry, sending module 1730 floods the unicast packet to all the other ACs associated with the VSI. If searching module 1720 finds a matching entry in the MAC address table, sending module 1730 adds a VSI label and a tunnel label to encapsulate and forward the unicast packet based on the entry and forward the unicast packet.

Figure 18:
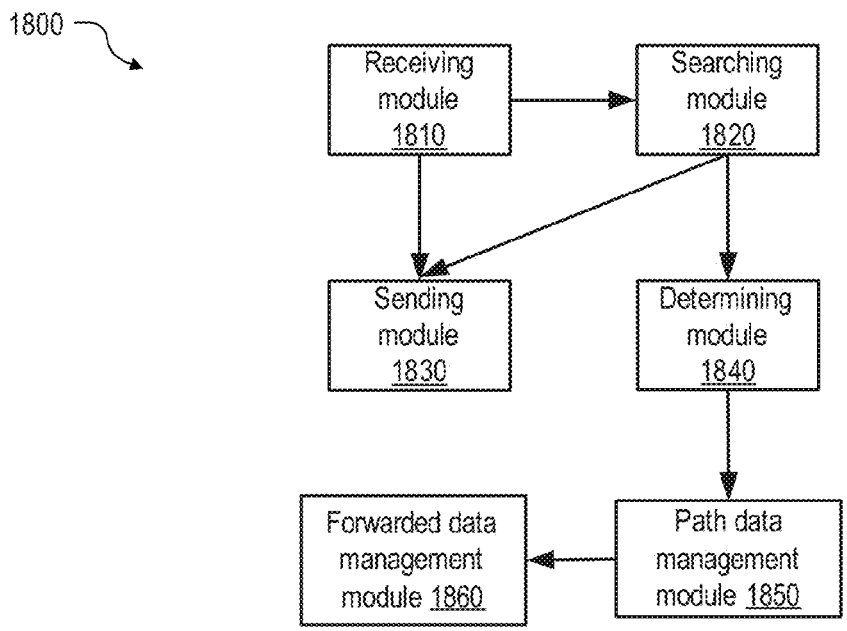
FIG. 18 is a block diagram of a PE device in examples of the present disclosure.

FIG. 18 is a block diagram of a first PE device 1800 in examples of the present disclosure. Like PE device 1700 (FIG. 17), first PE device 1800 includes receiving module 1710, searching module 1720, and sending module 1730. First PE device 1800 also includes a determination module 1840, a path data management module 1850, and a forwarding data management module 1860.

Receiving module 1710 receives a notification packet from a second PE device over a first MP2MP LSP service. The notification packet carries a MAC address that the second PE device learned from an AC, a VSI label of a VSI at the second PE device, a VPLS ID of the VPLS instance associated with the VSI, and the PE ID of the second PE device. The VSI is associated with VC LSPs of a PW between first PE device 1800 and the second PE device.

Determination module 1840 determines if first PE device 1800 has a VSI associated with the same VPLS instance as the VSI of the second PE device based on the VPLS ID carried in the notification packet. Path data management module 1850 adds a new entry recording the relationship among the MAC address, the VSI label, and the selected tunnel to the path database of the VSI of first PE device 1800 when determination module 1840 determines that the VSI of first PE device 1800 is associated with the same VPLS instance as the VSI of the second PE device. The selected tunnel is a tunnel selected by first PE device 1800 for the VSI of the second PE device from the tunnels between first PE device 1800 to the second PE device. Forwarding data management module 1860 updates the MAC address table associated with the VSI of first PE device 1800 based on the path database of the same VSI.

After first PE device 1800 learns a new MAC address from an AC of a VSI, sending module 1730 sends a notification packet to the first MP2MP LSP. The notification packet carries the MAC address, a VSI label corresponding to the VSI of first PE device 1800, a VPLS ID of a VPLS instance associated with the VSI, and the PE ID of first PE device 1800. Based on the notification packet, the other PE devices each add an entry to their MAC address tables for the same VPLS instance.

First PE device 1800 may also include a tunnel package removal module 1870 and a VSI label removal module 1880. Receiving module 1810 also receives an MPLS packet from a PW. Tunnel package removal module 1870 removes a tunnel label from the encapsulated packet, and VSI label removal module 1880 removes a VSI label from the encapsulated packet.

Sending module 1830 finds a MAC address table of a VSI based on a VSI label carried in the MPLS packet, and forwards the packet without the tunnel label and the VSI label based on the MAC address table.

Receiving module 1810 may receive a cancellation packet about an expired MAC address in the MAC address table of a VSI at the second PE device over the first MP2MP LSP. The cancellation packet carries the expired MAC address, the VPLS ID of a VPLS instance associated with the VSI at the second PE device, and the PE ID of the second PE device. Determination module 1840 may further determine if first PE device 1800 has a VSI of the VPLS instance identified in the cancellation packet. If so, path data management module 1850 further removes an entry recording the relationship of the MAC address identified in the cancellation message from a path database of the VSI, and notifies forwarding data management module 1860 to update the MAC address table of the VSI based on the path database.

When a MAC address expires in a MAC address table of a VSI at first PE device 1800, sending module 1730 further sends to the first MP2MP LSP a cancellation message carrying the expired MAC address, the VPLS ID of a VPLS instance of the VSI, and the PE ID of first PE device 1800. In response, the other PE devices delete the corresponding entry in the MAC address tables of the corresponding VSIs based on the expired MAC address carried in the cancellation message.

Forwarding of broadcast messages entails providing a second MP2MP LSP service to connect all the PE devices associated with the same VPLS instance and broadcasting packets through the second MP2MP LSP. Receiving module 1710 also receives a broadcast packet from an AC or the second MP2MP LSP. After receiving module 1710 receives a broadcast packet from an AC, sending module 1720 searches first PE device 1800 for a VSI associated with the AC and then broadcast the packet over the second MP2MP LSP corresponding to the VPLS of the VSI. After receiving module 1710 receives a broadcast packet from the second MP2MP LSP, sending module 1720 searches for a VSI of the VPLS instance corresponding to the second MP2MP LSP and floods all the ACs associated with the VSI In examples of the present disclosure, modules or units may be integrated to form a unitary structure or separately provided and arranged. In other examples, a single module or a single unit is provided. In additional examples, multiple sub-modules or multiple sub-units are provided.

In examples of the present invention, a module or unit may be a custom-made permanent circuit or logical device (such as a dedicated processor, field programmable gate array (FPGA), or application specific integrated circuit (ASIC)) for performing specific operation. In other examples, the module includes a programmable logical device, such as a general-purpose processor or other programmable processors, temporarily configured by software or a circuit for executing specific operation.

Figure 19:
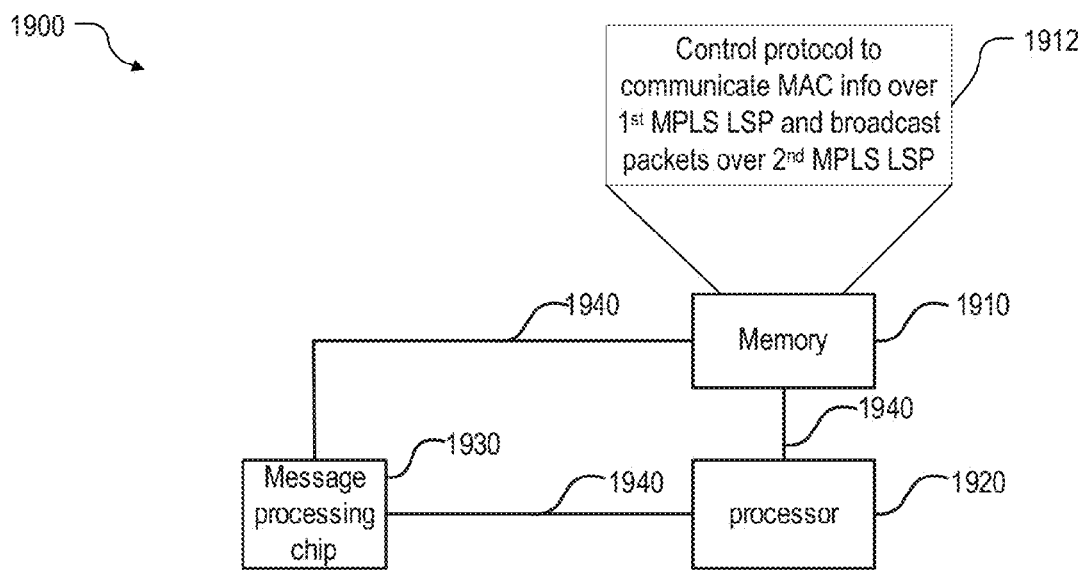
FIG. 19 is a block diagram of a PE device in examples of the present disclosure.

FIG. 19 is a block diagram of a PE device 1900 in examples of the present disclosure. PE device 1900 includes a memory 1910, a processor 1920, a packet processing chip 1930, and an interconnect 1940 coupled to memory 1910, processor 1920, and packet processing chip 1930.

Memory 1910 is a non-transitory processor-readable medium that stores processor-executable instructions 1912, related tables, the MAC address tables, and the path databases. The executable instructions 1912 that implement control protocol 126 (FIG. 1) to communicate MAC address information over the first MP2MP LSP and broadcast packets over the second MP2MP LSP.

Processor 1920 communicates with packet processing chip 1930, receives and sends data packets (e.g., unicast and broadcast packets received from ACs, MPLS packets received from PWs, and broadcast packets received from the second MP2MP LSP), receives and sends protocol packets (e.g., notification and cancellation packets), communicates with memory 1910, reads and executes the instructions stored in memory 1910, performs the functions of the modules shown in FIGS. 17 and 18, and processes packets sent from the packet processing chip 1930. Although one processor 1920 is shown, multiple processors 1920 may operate jointly to read and execute the instructions in memory 1910.

Packet processing chip 1930 has ports connected to the other PE devices in backbone network 104 and the CE devices at local sites. Packet processing chip 1930 processes the data and the protocol packets, sends the protocol packets from processor 1920 to the other PE devices over the first MP2MP LSP, sends broadcast packets from ACs to the other PE devices over the second MP2MP LSP, sends MPLS packets from processor 1920 (e.g., unicast packets from ACs encapsulated with labels) over PWs, sends broadcast packets received by processor 1920 from the second MP2MP LSP to local sites through ACs, sends packets stripped of labels (e.g., customer packets that results from stripping MPLS packets received on PWs) to local sites through ACs, and sends the protocol and the data packets to processor 1920.

Interconnect 1940 provides a channel whereby data exchange between the modules takes place. Interconnect 1940 may be a bus for connecting the modules or multiple circuits between the modules.

Various other adaptations and combinations of features of the examples disclosed are within the scope of the invention.

What is claimed is:

1. A method for a first provider edge (PE) device to forward packets in a virtual private local area network service (VPLS) network, the VPLS network comprising a backbone network having a plurality of PE devices, each PE device being connected by one or more attachment circuits (ACs) to one or more customer edge (CE) devices, the method comprising:
   the first PE device receiving a unicast packet on a first AC, the first AC being associated with a first virtual switch instance (VSI) on the first PE device;
   the first PE device searching, in a media access control (MAC) address table associated with the first VSI, for an entry that matches a first MAC address carried in the unicast packet, the first MAC address being a MAC destination address; and
   when a matching entry is not found for the first MAC address,
       the first PE device flooding the unicast packet to every AC, excluding the first AC, associated with the first VSI, and not flooding the unicast packet to the backbone network.

2. The method of claim 1, wherein:
   the VPLS network includes a first multipoint-to-multipoint label-switched path (MP2MP LSP) to connect the PE devices;
   a pseudo wire (PW) is established between VSIs on every two PE devices and belonging to a same VPLS instance;
   a unique VSI label is allocated to every VSI on each PE device, the VSI label corresponding to all inbound Virtual Circuit (VC) LSPs in PWs of the VSI; and
   the method further comprises, after learning a second MAC address from the first AC,
   the first PE device sending a first notification packet over the first MP2MP LSP, the first notification packet carrying the second MAC address, a first VSI label corresponding to the first VSI, a VPLS ID of the VPLS instance corresponding to the first VSI, and a PE ID of the first PE device, wherein, based the first notification packet, other PE devices each add an entry to MAC address tables of corresponding VSIs that belong to the same VPLS instance as the first VSI.

3. The method of claim 2, further comprising:
after a third MAC address in the MAC address table of the first VSI expires,
the first PE device sending a cancellation message to the first MP2MP LSP, the cancellation message carrying the third MAC address, the VPLS ID of the VPLS associated with the first VSI, and the PE ID of the first PE device, wherein, based on the cancellation message, the other PE devices each delete another entry in the MAC address table of the corresponding VSIs that belong to the same VPLS instance as the first VSI.

4. The method of claim 2, further comprising:
the first PE device receiving over the first MP2MP LSP a second notification packet from a second PE device, wherein the second notification packet carries a third MAC address that the second PE device learned from a second AC, a second VSI label corresponding to a second VSI on the second PE device, the VPLS ID of the VPLS instance of the first and the second VSIs, and a PE ID of the second PE device, the second AC being associated with the second VSI;
based on the VPLS ID carried in the second notification packet,
the first PE device determining if there exists a VSI on the first PE device that belongs to the same VPLS instance as the second VSI; and
when the first PE device determines the first VSI belongs to the same VPLS instance as the second VSI,
the first PE device creating another entry in the MAC address table corresponding to the first VSI, the other entry storing a relationship between the third MAC address, the second VSI label, and a selected tunnel, the selected tunnel being a tunnel selected for the second VSI from tunnels between the first PE device and the second PE device.

5. The method of claim 4, the method further comprises:
the first PE device receiving over the first MP2MP LSP a cancellation packet sent by the second PE device after a fourth MAC address in the second MAC address table of the second VSI expires, wherein the cancellation packet carries the fourth MAC address, the VPLS ID of the VPLS instance associated with the second VSI, and the PE ID of the second PE device;
based on the VPLS ID carried in the cancellation packet,
the first PE device determining if there exists a VSI on the first PE device that belongs to the same VPLS instance as the second VSI; and
when the first PE device determines the first VSI belongs to the same VPLS instance as the second VSI, the first PE device updating the MAC address table associated with the first VSI based on the cancellation packet to delete another entry corresponding to the fourth MAC address.

6. The method of claim 4, further comprising:
when a matching entry is found for the first MAC address, the first PE using the VSI label and a tunnel label listed in the matching entry to encapsulate and forward the unicast packet.

7. The method of claim 6, further comprising:
after receiving a MPLS packet from a PW,
the first PE device removing another tunnel label and another VSI label from the MPLS packet;
determining the other VSI label is associated with another VSI on the first PE device; and
looking up and forwarding the MPLS packet based on another MAC address table associated with the other VSI.

8. The method of claim 2, wherein:
the VPLS network includes a second MP2MP LSP to connect the PE devices that belong to the VPLS instance, the second MP2MP LSP to transmit broadcast packets; and
the method further comprises:
after receiving a broadcast packet on the first AC:
the first PE device determining the first AC is associated with the first VSI, and the VPLS instance of the first VSI is associated with the second MP2MP LSP; and
sending the broadcast packet through the second MP2MP LSP; and
after receiving another broadcast packet from the second MP2MP LSP:
the first PE device determining the VPLS instance of the first VSI is associated with the second MP2MP; and
broadcasting the other broadcast packet to all ACs associated with the first VSI and connect to local CE devices.

9. A first provider edge (PE) device for use in a Virtual Private LAN Service (VPLS) network having a first multipoint-to-multipoint label-switched path (MP2MP LSP) to connect PE devices, a pseudo wire (PW) established between VSIs on every two PE devices and belonging to a same VPLS instance, and a unique VSI label allocated to every VSI on each PE device where the VSI label corresponds to all inbound VC LSPs in PWs of the VSI, the first PE comprising:
a processor; and
a non-transitory processor-readable medium having stored thereon machine-readable instructions that cause the processor to:
receive a unicast packet on a first attachment circuit (AC);
search, in a media access control (MAC) address table corresponding to a first virtual switch instance (VSI) associated with the first AC, for an entry that matches a first MAC address carried in the unicast packet, the first MAC address being a MAC destination address of the unicast packet; and
flood the unicast packet to every AC, excluding the first AC, associated with the first VSI when a matching entry is not found for the first MAC address carried in the unicast packet, and
after learning a second MAC address from the first AC, send a first notification packet over the first MP2MP LSP, the first notification packet carrying the second MAC address, a first VSI label corresponding to the first VSI, a VPLS ID of the VPLS instance corresponding to the first VSI, and a PE ID of the first PE device, wherein, based the first notification packet, other PE devices each add an entry to MAC address tables of corresponding VSIs that belong to the same VPLS instance as the first VSI.

10. The first PE device of claim 9, wherein the non-transitory processor-readable medium comprises further machine-readable instructions that cause the processor to:
after a third MAC address in the MAC address table of the first VSI expires, send a cancellation message to the first MP2MP LSP, the cancellation message carrying the third MAC address, the VPLS ID of the VPLS associated with the first VSI, and the PE ID of the first PE device, wherein, based on the cancellation message, the other PE devices each delete another entry in the MAC address table of the corresponding VSIs that belong to the same VPLS instance as the first VSI.

11. The first PE device of claim 9, wherein the non-transitory processor-readable medium comprises further machine-readable instructions that cause the processor to:
- receive over the first MP2MP LSP a second notification packet from a second PE device, wherein the second notification packet carries a third MAC address that the second PE device learned from a second AC, a second VSI label corresponding to a second VSI on the second PE device, the VPLS ID of the VPLS instance of the first and the second VSIs, and a PE ID of the second PE device, the second AC being associated with the second VSI;
- determine if there exists a VSI on the first PE device that belongs to the same VPLS instance as the second VSI;
- when it is determined that the first VSI belongs to the same VPLS instance as the second VSI,
- add a relationship among the third MAC address, the second VSI label, and a selected tunnel to a path database on a control plane corresponding to the first VSI, the selected tunnel being a tunnel selected for the second VSI from tunnels between the first PE device and the second PE device; and
- update the MAC address table corresponding to the first VSI based on the path database corresponding to the first VSI.

12. The first PE device of claim 11, wherein the non-transitory processor-readable medium comprises further machine-readable instructions that cause the processor to:
- receive over the first MP2MP LSP a cancellation packet sent by the second PE device after a fourth MAC address in the second MAC address table of the second VSI expires, wherein the cancellation packet carries the fourth MAC address, the VPLS ID of the VPLS instance associated with the second VSI, and the PE ID of the second PE device;
- determine, based on the VPLS ID carried in the cancellation packet, if there exists a VSI on the first PE device that belongs to the same VPLS instance as the second VSI; and
- when it is determined that the first VSI belongs to the same VPLS instance as the second VSI, update the path database associated with the first VSI based on the cancellation packet to delete another entry corresponding to the fourth MAC address and update the MAC address table associated with the first VSI based on the path database.

13. The first PE device of claim 11, wherein the non-transitory processor-readable medium comprises further machine-readable instructions that cause the processor to:
- receive an MPLS message from a PW;
- remove another tunnel label from the MPLS packet;
- remove another VSI label from the MPLS packet after the other tunnel label has been removed;
- determine that the other VSI label is associated with another VSI on the first PE device, and
- look up and forward the MPLS packet based on another MAC address table associated with the other VSI.

14. The first PE device of claim 9, wherein the VPLS network includes a second MP2MP LSP to connect the PE devices that belong to the VPLS instance, the second MP2MP LSP to transmit broadcast packets and the non-transitory processor-readable medium comprises further machine-readable instructions that cause the processor to:
- receive a broadcast packet on the first AC;
  - determine that the first AC is associated with the first VSI, and that the VPLS instance of the first VSI is associated with the second MP2MP LSP; and
  - send the broadcast packet through the second MP2MP LSP; and
- after receiving another broadcast packet from the second MP2MP LSP:
- determine the VPLS instance of the first VSI is associated with the second MP2MP; and
- broadcast the other broadcast packet to all ACs associated with the first VSI.

* * * * *